Oct. 8, 1957  A. L. QUINLAN  2,809,274
PERCUSSION WELDING APPARATUS
Filed Feb. 28, 1955  3 Sheets-Sheet 1
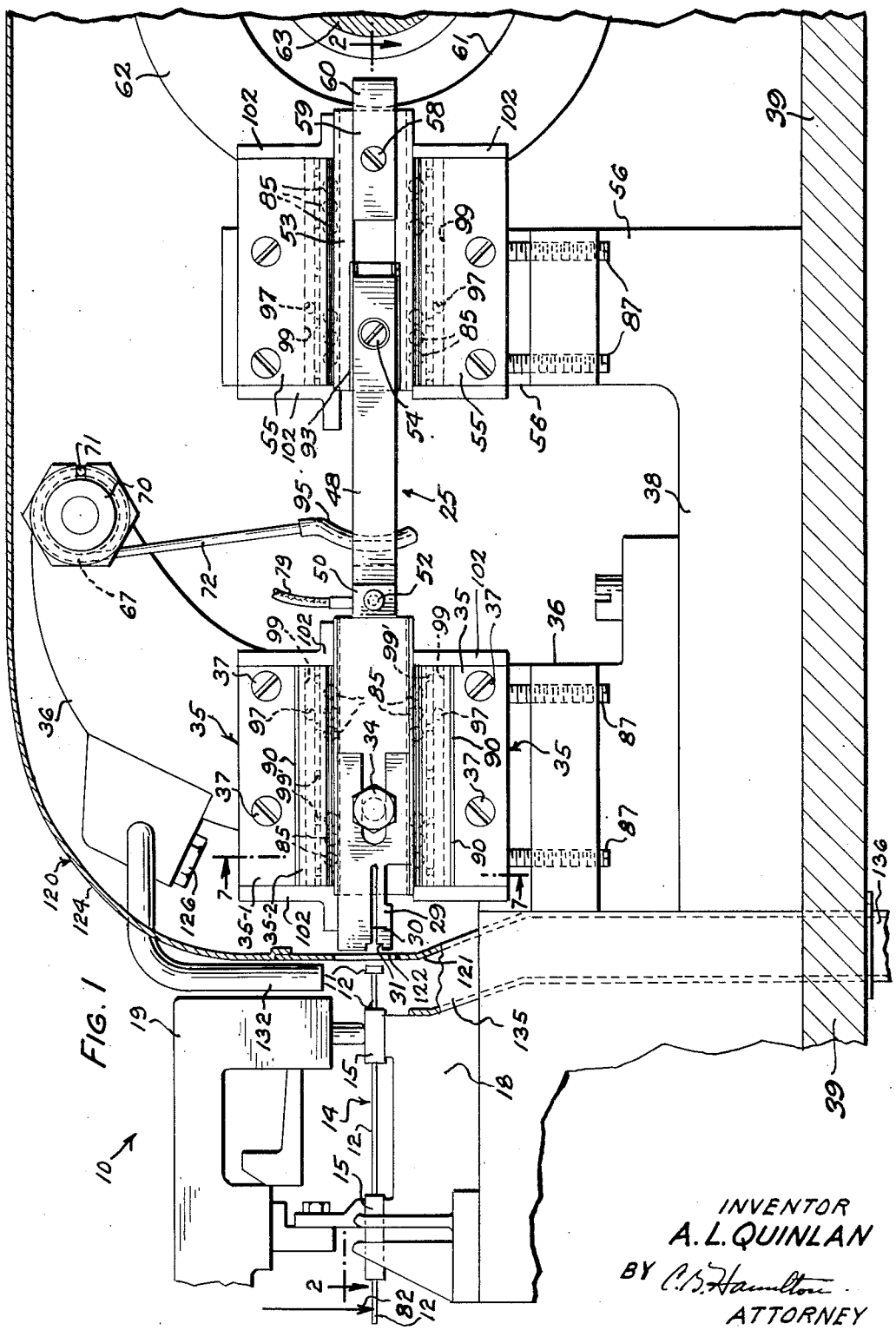
INVENTOR
A. L. QUINLAN
BY C. B. Hamilton
ATTORNEY

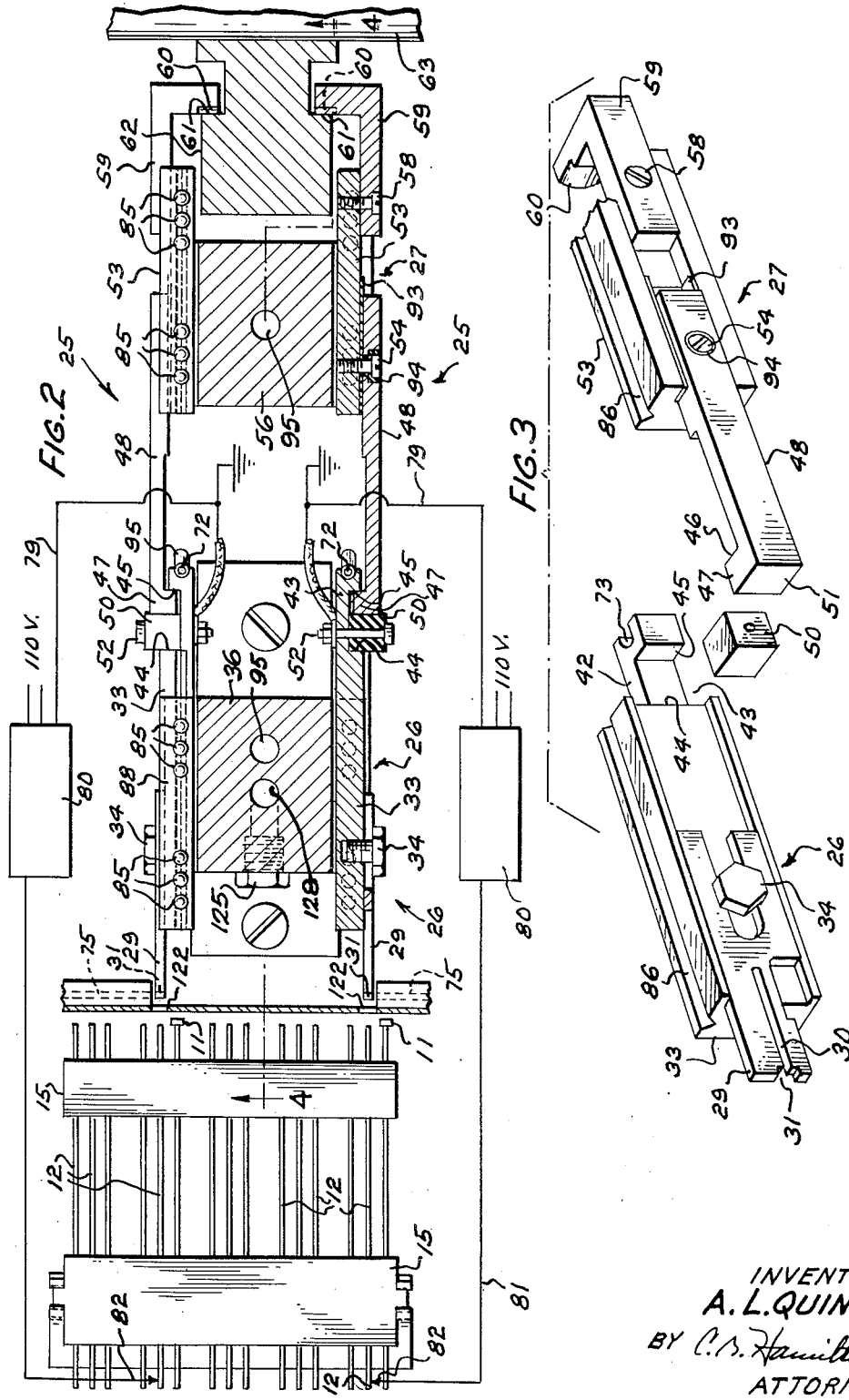

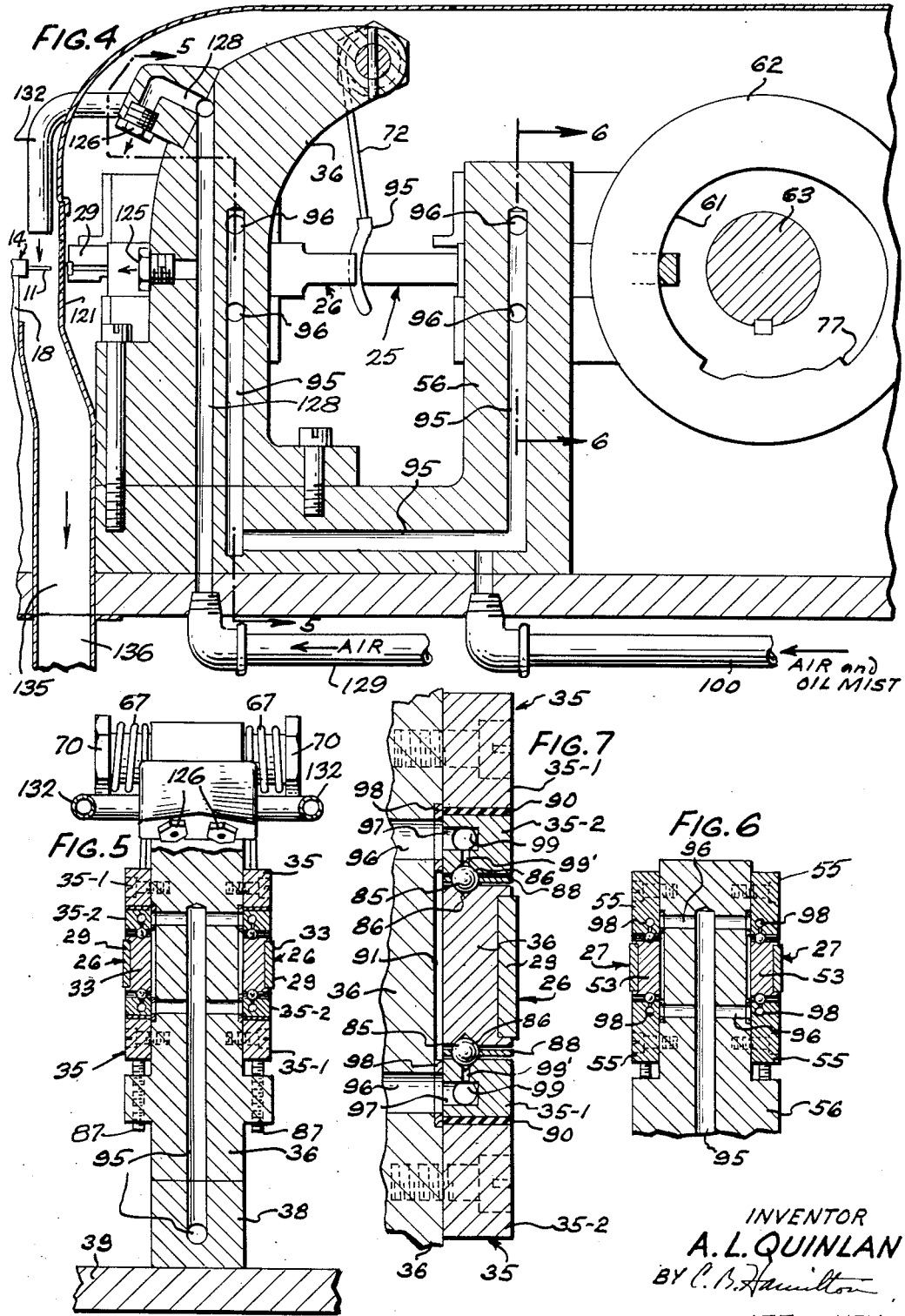

United States Patent Office 2,809,274
Patented Oct. 8, 1957

2,809,274

PERCUSSION WELDING APPARATUS

Amos L. Quinlan, La Grange Park, Ill., assignor to Western Electric Company, Incorporated, New York, N. Y., a corporation of New York Application February 28, 1955, Serial No. 491,039

10 Claims. (Cl. 219—95)

This invention relates to a percussion welding apparatus and more particularly to a delayed rebound mechanism for percussion welding electrodes.

In the percussion welding of a contact onto the end of a wire spring of a relay part, the contact is supported in a reciprocable electrode which is propelled to carry the contact into forcible engagement with the end of the wire and cause it to be percussively welded thereto. The rebound of the electrode after impact with the end of the wire tends to pull the contact away from the wire and weaken the weld therebetween unless the fused metal has had sufficient time to freeze and effect a strong bond therebetween.

An object of the present invention is to provide a welding apparatus having a reciprocable welding electrode for percussively welding an element onto a part and provided with means for increasing the time that the electrode maintains the element in engagement with the part after impact of the element against the part.

Another object of the invention is to provide anti-friction guide means for supporting the electrode for free and easy reciprocable movement through a predetermined path.

A further object of the invention is to provide means for dissipating the contaminated atmosphere from the welding zone of the apparatus.

A device illustrating certain features of the invention for percussively welding contacts onto the ends of wire springs of a relay part may include a percussion welding apparatus having a holder for supporting a part on which the contact is to be welded and having a reciprocable electrode which is spring urged for movement toward the part and is provided with a recess for supporting a contact and for carrying the contact into engagement with the part. The part and the electrode are connected to a device for supplying a welding current thereto so that as the electrode thrusts the contact against the wire a welding circuit is completed and the contact is percussively welded thereto. An inertia member is connected to one end of the electrode and yieldably held in a normal position relative thereto by a resilient element, and a cam actuates the inertia member and the electrode to retract and release them whereby they are propelled forwardly to thrust the contact against the end of the wire spring and effect the welding of the contact thereto, and upon impact of the contact with the wire the electrode is stopped but the inertia member strikes the resilient element and applies additional force thereto and momentarily delays the rebound of the electrode to provide additional time for the fused portions of the wire spring and the contact to solidify before the rebound of the electrode applies a force on the contact tending to pull it off of the wire.

Other objects and advantages of the invention will become apparent by reference to the following detailed description and the accompanying drawings illustrating a preferred embodiment thereof, in which:

Fig. 1 is a fragmentary side elevational view of a welding apparatus showing an improved welding gun thereon with a delayed rebound mechanism;

Fig. 2 is a fragmentary plan sectional view of the apparatus taken on line 2—2 of Fig. 1;

Fig. 3 is a perspective view showing components of the welding gun in separated relation to each other;

Fig. 4 is a fragmentary vertical longitudinal sectional view through the apparatus taken on line 4—4 of Fig. 2 and showing the mechanism for removing the contaminated atmosphere from the welding zone;

Figs. 5 and 6 are vertical sectional views taken on lines 5—5 and 6—6, respectively, of Fig. 4; and Fig. 7 is an enlarged fragmentary vertical sectional view taken on line 7—7 of Figs. 1 and 2 and showing the ball bearing mounting for the welding gun and the means of insulating it from the apparatus.

The present welding apparatus 10 is designed to weld rectangular contacts 11 (Fig. 2) onto the ends of a plurality of wire springs 12 of a relay part 14. The wire springs 12 are molded in a row in spaced relation to each other in a pair of supporting strips 15 of insulating material. The apparatus, only portions of which are illustrated herein, is similar to that disclosed in the pending patent application on a mechanism for welding contacts onto switch parts by E. W. Larsen, Serial No. 347,335, filed April 7, 1953. The relay part 14 is adapted to be clamped in a holder 18 by a clamping member 19 in a predetermined position with the part horizontally aligned with a pair of welding guns 25—25, and with a pair of the wire springs 12 in longitudinal alignment therewith. Only one of the welding guns 25, which are substantially identical, will be described in detail.

The welding gun 25 comprises a welding electrode 26 and an inertia member 27 loosely connected together. The welding electrode has a welding jaw 29 with a horizontal slot 30 therein to form a pair of parallel arms, the forward ends of which are notched to provide a recess 31 for receiving a contact 11 therein. The lower arm of the jaw serves as a spring to yieldably clamp the contact 11 against the upper arm to yieldably retain the contact in the recess. The welding jaw 29 fits in a recess in a slide 33 of the electrode and is adjustably secured thereto by a screw 34 to permit grinding and reshaping the end of the jaw as it wears or burns away. The slide 33 is mounted for horizontal movement in guides 35, 35 secured to one side of a bracket 36 by screws 37. The bracket 36 is secured to and forms a part of a base 38 which is fixed to a horizontal frame plate 39 of the apparatus.

A reduced rearwardly extending end portion 42 of the slide 33 has a vertical slot 43 therein forming a pair of opposed shoulders 44 and 45. The shoulders 45 on the slide 33 engage a shoulder 46 on a head or laterally extending end 47 of a bar 48 which forms one component of the inertia member 27. A resilient element 50 in the form of a rectangular block of rubber disposed between the shoulder 44 of the slide and the end face 51 of the bar 48, is secured to the slide 33 by a bolt and nut 52 and serves to yieldably maintain the head 47 of the inertia member 27 in engagement with or in close proximity to the shoulder 45 of the electrode 26.

The bar 48 is secured to a slide 53 of the inertia member by a screw 54, and the slide is mounted in alignment with the slide 33 in a pair of guides 55, 55 which are secured to one side of a bracket 56 extending upwardly from the base 38. Also secured to the slide 53 by a screw 58 is an L-shaped cam follower 59, the laterally disposed end 60 of which engages an internal cam surface 61 of a double cam 62 secured to a cam shaft 63. The inertia member 27 of the welding gun serves as a link between the electrode 26 and the cam 62. The cam 61 is shaped to retract the welding gun and control its reciprocation in cooperation with a resilient actuating element 67 which stresses the electrode for forward movement.

The actuating element 67 comprises a torsion spring supported on a headed pin 70 on the bracket 36 and having one end 71 locked against rotation and having the other end in the form of an arm 72 engaging the electrode 26 in the slot 73. The actuating element 67 is tensioned to urge the welding gun toward the wires 12 of the relay part, and the cam surface 61 serves to retract the welding gun to a loading position where a contact is fed into the recesses 31 of the welding jaw 29 by a feed bar 75 movable transversely of the guns. The cam surface 61 also has a shoulder or drop-off 77 which releases the gun and permits it to be propelled forwardly by the spring 67 to thrust the contact 11 into engagement with the end of a wire 12 aligned therewith.

Means are provided for supplying a high voltage welding current to the contact and the wire to effect the percussion welding of the contact onto the wire as the contact is thrust thereagainst. Each of the slides 33 of the welding guns 25 is electrically connected by a conductor 79 to a capacitor of a device 80 which is connected to a power line and has a generator for charging the capacitor, and a conductor 81 and a movable brush 82 connect the capacitor to a wire spring 12 in alignment with the welding gun. The device 80 is grounded to the apparatus through the conductors 79 to avoid electric shock to the operator.

When the contact 11 approaches the end of the wire spring 12 and the gap therebetween becomes sufficiently small, as the contact is thrust thereagainst by the welding gun, the capacitor discharges, causing the current to arc across the gap and fuse a thin layer of metal on adjacent portions of the wire and the contact, which fused portions are forced together and solidfy to effect the welding of the contact to the wire. The impact of the welding electrode 26 and the contact 11 against the wire compresses the wire longitudinally which then springs back and causes the electrode to rebound. The rebound of the electrode, which frictionally grips the contact, yieldably applies a force to the contact, tending to pull it away from the wire, and if the fused metal of the wire and the contact has not solidified sufficiently before the rebound occurs, the pull of the electrode on the contact produces an imperfect and weakened weld. As the forward movement of the electrode is arrested, the inertia member 27 momentarily continues its forward movement until it compresses and is stopped by the resilient bumper 50. Since the inertia member 27 applies its energy progressively to the electrode 26 after the electrode has stopped moving and as the resilient bumper element 50 is compressed, this auxiliary thrust on the elcetrode 26 effects a delay in the rebound thereof and provides a longer interval of time in which the contact and the wire are maintained in engagement with each other while the adjacent portions thereof are fused and provides a longer time in which the fused portions may solidfy to form a strong weld therebetween.

The holder 18 and the relay part 14 thereon are adapted to be indexed step by step to align successive wire springs 12 with the welding guns 25 and the movable brushes 82 are adapted to be actuated into engagement with successive wires 12 in alignment with the welding guns.

To provide for free and accurate reciprocation of the welding gun the slides 33 and 58 are mounted on ball bearings 85 which ride in V-shaped ways 86 formed in the slides 33, 53 and the guides 35, 35 and 55, 55 and are retained in predetermined spaced relation to each other by strips 88 of insulating material. The lower guides 35 and 55 are vertically adjustable relative to the upper guides by screws 87 threadedly mounted in portions of the brackets 36 and 56.

Since the device 80 for supplying the high voltage welding current is grounded to the apparatus through the conductors 79, means are provided for insulating the electrodes 26 of the welding guns 25 from the supporting framework to prevent some of the current from passing through the framework and the guides 35 to the electrode 26 and cause arcing and pitting of the ball bearings. For this purpose each of the guides 35 are made in two sections 35–1 and 35–2 which are separated by and cemented to a strip of insulating material 90 disposed therebetween. The bracket 36 is formed with a shallow recess 91 (Fig. 7) adjacent the slide 33 to provide clearance for the electrode. The bar 48 of the inertia member 27 is supported in insulated relation to the slide 53 by a U-shaped strip of insulating material 93 interposed therebetween and by suitable sleeves and washers of insulating material 94 interposed between the bar and the screw 54. A sleeve of insulating material 95 on the lower end of the spring 72 is engageable with the electrode 26 and insulates the spring therefrom. Thus, it will be seen that the electrode 26 is electrically connected to the current supply device 80 through the conductor 79 and is insulated from the guides 35 and supporting framework of the apparatus.

The brackets 36 and 56 have interconnected passageways 95 (Figs. 4, 5, and 6) formed therein which have laterally disposed portions 96 aligned with recesses 97 in the guide sections 35–2. Gaskets 98 (Fig. 7) are disposed between the brackets 36, 56 and the guides 35 and 55. The recesses 97 intersect horizontal passageways 99 which have a plurality of vertical ports 99′ communicating with the V-shaped guideways 86 of the guide sections 35–2 and the ball bearings 85. The passageway 95 is connected to a supply line 100 for supplying air and oil mist into the V-shaped giudeways 86 and onto the ball bearings 85 to blow away any partciles of dirt or foreign matter therefrom and to supply a lubrication for the ball bearings. Dust guards 102 of insulating material secured to the guides 35 and 55, have V-shaped ends fitting into the V-shaped grooves in the slides for keeping out foreign particles.

As a result of the welding operation the atmosphere in the region of the weld is contaminated with ionized gas and minute particles of vaporized metal which prevents obtaining uniform welds of the contacts onto the wire springs and which may foul the guns 25. Means are provided for dissipating the contaminated atmosphere from the zone of welding to protect the welding guns 25 therefrom and to provide a clean atmosphere for welding. For this purpose the welding guns are enclosed in a protective housing 120 which comprises a wall 121 disposed between the holder 18 and the bracket 36 and having a pair of apertures 122 providing clearance for movement of the welding jaws 29 therethrough. The upper portion 124 of the housing is removable to provide access to the welding guns.

A nozzle 125 is mounted on the bracket 36 between the welding guns 25 in horizontal alignment therewith and a pair of angularly disposed nozzles 126 mounted on the bracket 36 above the level of the guns for supplying air within the housing 120 and directing it towards the apertures 122 for preventing the contaminated air from entering the housing. The nozzles 125 and 126 communicate with a passageway 128 in the bracket 36 and the passageway 128 is connected to a supply line 129 which continuously supplies air under a predetermined pressure to the nozzles 125 and 126. A pair of nozzles 132 in the form of tubes in communication with the passageway 128 extend from the bracket 32 through apertures in the housing 120 for directing air downwardly into the welding zone as shown in Fig. 1 for blowing the contaminated atmosphere therefrom. The contaminated atmosphere is also withdrawn from the welding zone through an exhaust duct 135 which extends downwardly from below the welding zone and is connected to an exhaust line 136. Thus, any contaminated atmosphere formed in the welding zone by successive welding operations is removed therefrom by the combined action of the air streams from the nozzles 125, 126, and 132 and the exhaust through the duct 135 to provide an uncontaminated atmosphere in the welding zone and to protect the welding guns from the vaporized particles.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for percussively welding an element onto a part, the combination of means for supporting a part, an electrode for supporting an element, means for moving the electrode with the element toward the part-supporting means to effect a percussive engagement between the element and the part and the welding of the element to the part, and an inertia member mounted on the electrode for movement therewith toward the supporting means and for limited movement in the same direction relative to the electrode after the electrode has been stopped for preventing rebound of the electrode relative to the part-supporting means until the weld between the part and the element solidifies.

2. In an apparatus for percussively welding an element onto a part, the combination of an electrode having means for supporting an element to be welded, means for propelling said electrode toward a part supported in its path to thrust the element against the part to weld them together, an inertia member, and means connecting said inertia member to said electrode for movement therewith and for a limited movement relative thereto to cause the inertia member to advance relative to said electrode in response to the arresting of the movement of the electrode by the engagement of the contact with the part to retard the rebound of the electrode.

3. In an apparatus for percussively welding an element onto a part, the combination of a welding electrode having means for supporting an element, means for propelling the electrode toward a part supported in its path to thrust the element against the part to weld them together, an inertia member, means mounting the inertia member for movement with said electrode and for limited movement relative thereto, and resilient means on said electrode for stopping the movement of said inertia member in response to the arresting of the forward movement of said electrode as the element is thrust against said part to effect a delay in the rebound of said electrode.

4. In an apparatus for percussively welding an element onto a part, the combination of a holder for supporting a part in a predetermined position, a welding electrode having means for supporting an element, means for propelling said electrode toward said holder to thrust the element against said part, means for electrically connecting said part and the electrode to a device for supplying a welding current to percussively weld the element to said part in response to the movement of the element against said part, an inertia member connected to said electrode for movement therewith and for limited movement relative thereto, and resilient means on said electrode for stopping the movement of said inertia member.

5. In an apparatus for percussively welding an element onto a part, the combination of a holder for supporting a part in a predetermined position, an electrode having means for supporting an element, means for propelling said electrode toward said holding means to thrust the element into engagement with said part, means for connecting said part and said electrode to a device for supplying a welding current to percussively weld the element to said part in response to movement of the element into engagement with said part, an inertia member, means connecting said inertia member to said electrode for movement therewith and for limited movement relative thereto including means for establishing a rigid connection between said electrode and said inertia member for forward movement together and including resilient means for stopping the forward movement of the inertia member relative to said electrode when the movement of the electrode is arrested by the engagement of the element with said part, whereby said inertia member is advanced through a predetermined distance relative to the electrode to apply its momentum thereto for retarding the rebound thereof.

6. In an apparatus for percussively welding an element onto a part, the combination of a holder for supporting a part in a predetermined position, a welding electrode mounted for movement toward said holder and having means for supporting an element for movement therewith into engagement with a part in said holder, means for stressing said electrode for rapid movement toward said holder, means for retracting and releasing said electrode to cause it and a contact therein to be propelled toward said part in said holder, means for electrically connecting said part and said electrode to a device for supplying a welding current thereto to percussively weld the element to said part in response to the movement of the element against said part, an inertia member, means for connecting the inertia member to said electrode for movement therewith and for limited movement relative thereto, and resilient means on said electrode for stopping the movement of the inertia member in response to the arresting of the movement of said electrode as the element is thrust against said part to effect a delay in the rebound of said electrode.

7. In an apparatus for percussively welding an element onto a part, the combination of a holder supporting a part in a predetermined position, a welding electrode having means for supporting an element, an inertia member, means for connecting the inertia member to said electrode for movement therewith and for limited movement relative thereto, roller bearing guide means for supporting said electrode and said inertia member for movement in a straight line toward said holder, means for propelling the electrode toward said holder to thrust the element therein against said part, and means for electrically connecting said part and said electrode to a device for supplying welding current thereto to percussively weld the element to said part in response to the movement of the element against it.

8. In an apparatus for percussively welding an element onto a part, the combination of means for supporting a part in a predetermined position, a welding electrode having means for supporting an element, an inertia member, means for connecting the inertia member to said electrode for movement therewith and for limited movement relative thereto, roller bearing guide means for supporting said electrode and said inertia member for movement in a straight line to and from said holder, means for stressing said electrode for rapid movement toward said holder, means for retracting and releasing said electrode to effect the movement of said electrode to thrust the element against said part, means for electrically connecting said part and said electrode to a device for supplying a welding current thereto to percussively weld the element to said part in response to the movement of the element against said part, and resilient means on said electrode for stopping the movement of the inertia member in response to the arresting of the movement of said electrode as the element is thrust against said part to effect a delay in the rebound of said electrode.

9. In an apparatus for percussively welding an element onto a part, the combination of a holder for supporting a part in a predetermined position, a welding electrode having means for supporting an element and having a pair of longitudinally disposed grooves, supporting means having longitudinal grooves disposed opposite the grooves in said electrode and cooperable therewith to form raceways, a plurality of roller elements in said raceways cooperating therewith to support said electrode for reciprocable movement along a predetermined path to and from said holder and against movement transversely of said path, means for actuating said electrode to thrust an element against said part to weld it thereon, passageways in said supporting means communicating with said raceways, and means for flowing air and oil mist through said passageway into said raceways to blow foreign particles from the raceways and to lubricate the roller elements therein.

10. In an apparatus for percussively welding an element onto a part, the combination of a holder for supporting a part in a predetermined position, a welding electrode having means for supporting an element and having a pair of longitudinally disposed grooves, an inertia member having a pair of longitudinally disposed grooves, supporting means having longitudinal grooves disposed opposite the grooves in said electrode and said inertia member and cooperable therewith to form raceways, a plurality of roller elements in said raceways cooperating therewith to support said electrode and said inertia member for reciprocable movement along a predetermined path to and from said holder and against movement transversely of said path, means for electricallly connecting the electrode and the part to a device for supplying welding current thereto, means for propelling said electrode to thrust the element therein against the part in said holder to weld the element thereto, means for connecting said inertia member to said electrode for movement therewith and for limited movement relative thereto for retarding the rebound of said electrode, passageways in said supporting means communicating with said raceways, and means for flowing air and oil mist through said passageways into said raceways to blow foreign particles from the raceways and to lubricate the roller elements therein.

References Cited in the file of this patent

UNITED STATES PATENTS

| | | |
|---|---|---|
| 1,228,843 | Spire | June 5, 1917 |
| 1,788,908 | Buttolph | Jan. 13, 1931 |
| 2,332,581 | Kohler | Oct. 26, 1943 |